United States Patent [19]

Ishikuro et al.

[11] Patent Number: 5,237,305
[45] Date of Patent: Aug. 17, 1993

[54] HOME BUS SYSTEM

[75] Inventors: Dai Ishikuro; Yoshiji Minagawa, both of Kamakura; Takao Tsutsumi, Shizuoka, all of Japan

[73] Assignee: Mitsubishi Denki Kabushiki Kaisha, Japan

[21] Appl. No.: 797,779

[22] Filed: Nov. 25, 1991

[30] Foreign Application Priority Data

| Nov. 30, 1990 | [JP] | Japan | 2-339304 |
| Nov. 30, 1990 | [JP] | Japan | 2-339305 |
| Nov. 30, 1990 | [JP] | Japan | 2-339306 |
| Nov. 30, 1990 | [JP] | Japan | 2-339307 |
| Nov. 30, 1990 | [JP] | Japan | 2-339308 |

[51] Int. Cl.$^5$ .............................. G08B 25/00
[52] U.S. Cl. ............ 340/286.01; 340/286.11; 340/286.14; 340/525; 340/310 R
[58] Field of Search ......... 340/286.01, 286.02, 340/286.11, 286.12, 286.13, 286.14, 525, 506, 825.06, 701, 703, 310 R, 310 A, 310 CP, 286.06

[56] References Cited

U.S. PATENT DOCUMENTS

| 4,600,918 | 7/1986 | Belisomi et al. | 340/286.13 |
| 4,665,544 | 5/1987 | Honda et al. | 379/104 |
| 4,933,667 | 6/1990 | Shaw et al. | 340/286.11 |

FOREIGN PATENT DOCUMENTS

| 3347644 | 11/1984 | Fed. Rep. of Germany . |
| 1-159707 | 6/1989 | Japan . |
| 2162978 | 2/1986 | United Kingdom . |

OTHER PUBLICATIONS

EP00141131, IBM May 1985 pp. 1-16.
EPO 369,382, Sony Corp., May 1990 pp. 2-12.
1987 Carnahan Conference on Security Technology, "The Livermore Console System", J. C. Smart, Jul. 1987.
National Technical Report vol. 32, Dec. 1986, K. Tanie et al pp. 852-865, Japan.
Patent Abstract of Japan, Publication No.-JP63228305 Jan. 1989, Abstract vol. 013030, Hitachi Chem. Co. Ltd.

Primary Examiner—Donnie L. Crosland
Attorney, Agent, or Firm—Wolf, Greenfield & Sacks

[57] ABSTRACT

A home bus system is to perform concentrated monitoring and control of electric appliances positioned in a house as well as alerting users by monitoring outputs from security sensors positioned in places of consideration in the house. The appliances, and the occurrence of emergencies sensed by the security sensors, appear on the screen of a visual controller in the form of pictographs. Data about the pictographs are stored in a memory such as a graphic ROM, and once stored data are read from the memory to be displayed on the screen.

29 Claims, 10 Drawing Sheets

- NAME BEFORE CHANGE
- NAME AFTER CHANGE
- NUMBER OF ROOM CONTROLLERS

- TIMER
- ROOM NAME DISPLAY
- REGISTERED STATE DISPLAY
- CONNECTED APPLIANCE DISPLAY (CONTROL TARGET)
- PATTERN DISPLAY
- ROOM NAME DISPLAY
- REGISTERED APPLIANCE MARK DISPLAY
- WINDOW SETTING MONITOR DISPLAY

HOME BUS SYSTEM

BACKGROUND OF THE INVENTION

1. Field of the Invention

This invention relates to a home bus system having a structure in which a plurality of room controllers are connected to a visual controller via a home bus.

2. Description of the Related Arts

A home bus system is to provide centralized control of a plurality of electric appliances. The structure of this system is such that a plurality of room controllers are connected to a visual controller via a home bus.

Each room controller serves as a terminal performing functions of monitoring and controlling the operating state of electric appliances such as electric lamps, air conditioners and the like positioned in respective rooms in a house, and acquiring data from security sensors installed in respective rooms for sensing a fire, a gas leak, trespassers and other emergencies. To establish such connection among electric appliances as mentioned above, the room controller is usually provided with a plurality of terminals.

The visual controller serves as a terminal performing the functions of acquiring data representing the operating states of the electric appliances, in order to display information on the operating states. The visual controller also displays information in response to an output from the security sensors. Users of this system issue instructions for the appliances by operating switches in accordance with the information on a screen.

To enable the visual controller to acquire data about the operating state or the security, the visual controller must be connected to the room controllers. Such an electrical connection is generally achieved by a so-called home bus or home bus line in the existing home bus system.

One of the existing home bus systems is exemplified in National Technical Report Vol. 32 No. 6, Dec. 1986. In this system, the operating states of electric appliances are indicated by color; namely, an ON state and a CLOSED state are denoted in white with a green background, and an OFF state and an OPENED state are denoted in black with an ivory background.

With such a display, however, users of the system are required to understand the operating state of the electric appliances only from the color of the visual controller screen. If users are fully accustomed to the system, this type of display allows users to utilize the system smoothly. However, if users are less accustomed to, or inexperienced with, the system, they may have difficulty in understanding the meaning of the color combinations.

Further, in this system, once the screen of the visual controller has changed to the security display in response to the output of the security sensor, the control of the electric appliance cannot be resumed without terminating the security sensor. Namely, once the security screen has appeared on the screen, it is impossible to change the screen to a screen showing a controlled state, or a control screen. While the security screen appears on the screen, the controlled state of the electric appliances is not indicated on the screen of the visual controller. This actually results in the users being unable to provide instructions to the electric appliances from the switch.

Since the transition of the screen to the security screen is only caused when am emergency has arisen, users must take some action against such a situation. In the existing system, however, the security screen merely indicates the occurrence of the emergency but does not indicate the specific room where the emergency arose, dragging the response time from the discovery of the emergency to taking action.

Electric appliances to be controlled would often be activated at a given hour by means of a timer. In the existing system set forth in the above, ON-OFF or OPENING-CLOSING control of the electric appliances adjusted to a user's life cycle on weekdays is usually achieved by the use of the timer. During a timer setting, the screen of the visual controller has indications of the ON/OFF state of the timer, a starting time of the operation of the electric appliances using the timer, and a finishing time of the operation. Usually, the life cycle of the user on weekends will be different from that on weekdays. Therefore, users were obliged to reset the timer before weekends, and vice versa on weekdays.

In the existing system, a large cathode-ray-tube which can display the operating state of all electric appliances is used as the display for the visual controller. This resulted in a bulky home bus system including the visual controller, occupying too much space.

In order to overcome the drawbacks set forth in the above and achieve an improvement in visuality and diversification of the display, a color LCD (liquid crystal display) may be used as a display means to display the state of the electric appliances.

Noticeable in recent years, there has been a tendency for the number of electric appliances used in one room to be increased. Since there are limitations in the number of electric appliances connectable with one room controller, a plurality of room controllers may need to be placed in one room, and each room controller requires its own name. Accordingly, the electric appliances connected to different room controllers positioned in the same room cannot be controlled without the designation of a different room name, the electric appliances connected to a different room controller cannot be controlled.

SUMMARY OF THE INVENTION

The present invention is aimed at overcoming the foregoing drawbacks in the conventional art.

It is one object of the invention to provide a system capable of displaying a screen by which users can readily grasp the operating state of electric appliances.

It is another object of the invention to provide a system capable of switching a security screen to a control screen even while the security sensor is sensing an emergency, and with which system users can control the electric appliances connected to a room controller and acquire security data with the screen changed to the control screen.

It is still another object of the invention to provide a system with which users can readily realize where the emergency has arisen while the security display is appearing.

It is a further object of the invention to provide a system capable of temporarily holding a timer operation with the setting of the timer maintained, and informing users of this suspended state of the timer.

It is a still further object of the invention to provide a system capable of handling the electric appliances which are connected to a different room controller but positioned in the same room as the appliances in a same group.

To this aim, according to one aspect of the present invention, there is provided a home bus system comprising: a given number of room controllers connected to a plurality of loads such as electric appliances and security sensors for monitoring the operating state of the appliances, and outputting a signal to inform of the state; visual controllers for displaying a display in response to a signal outputted from the room controllers, the visual controller including a console panel, a first memory for storing a control program, a second memory for storing a predetermined amount of data representing pictographs, background colors, and characters, control means for selectively reading data stored in the second memory in response to a signal outputted from at least either key boards on the console panel or the room controller under the control of the control program, image composition means for producing image data by the composition of data, which include at least the data fetched from the second memory, outputted from the control means, and display means for displaying a screen based on image data generated; and a home bus connected between the room controllers and the visual controller for supplying signals from the room controllers to the visual controller.

Using pictographs stored in the memory when necessary allows users to readily understand the operating state of the appliances. The use of other memories is preferable to store data candidate for image composition as well as to display a display screen. An interface may be provided to connect between the room controllers and the home bus and between the room controllers and the console.

The screen on the visual controller may consist of room status screen, function status screen, room name setting screen, timer setting menu screen, appliance menu screen, security screen and the like. These screens may be interchangeable each other by the user's operation.

When indicating a display on the screen of the visual controller, the control means responsive to signals both from the room controllers and the console substantially reads the contents of the first memory, and supplies the data to the image composition means. The image composition means generates images by the composition of the data supplied, and the display means displays the image.

When displaying the room status screen, what the control means reads from the second memory and outputs to the image composition means are data about one of the room controllers, the data comprising at least character data which represents a name of the designated room, pictographic data which depict the connected appliances, and character data which represent the operating state of the appliances. Once the image composition and display have been effected, the screen changes to a room status display which represents the operating state of the electric appliances on a room controller basis. Viewing this screen display enables users to grasp the state of each room. As described above, the use of pictographs allows the rapid and easy understanding of the contents of the display.

The use of different background colors depending on the operating state of the electric appliances will result in an improvement in visuality. Iterative composition of images as the operating state of the electric appliances change may effect real-time monitoring of each room. If the number of the electric appliances is too great to be displayed on a single screen display, paging may be effected with the assignment of a plurality of pages to the appliances.

To implement the display of the room name setting, means for directing the control means to display the room setting display may need to be provided at the console. In response to such instruction, the control means reads data from the second memory and outputs to the image composition means, and the image composition means generates images corresponding to the received data. The data fetched from the memory comprises pictographic data depicting a room name, an electric appliance and the like. Because of such a data, the display appearing on the screen may be called a room name setting screen depicting electric appliances positioned in each room. Users perform a set of designating operations of portions of the display appearing on the screen by the operation from the console. Likewise, users carry out the increment or decrement of thus selected portional displays, and select new displays such as a room name and a pictograph and the like. The control means, responsive to such setting, reads data from the second memory, and outputs the data to the image composition means. As a result, the portional displays designated are replaced with displays which correspond to a newly selected room name and the like.

This results in the simple setting of the room name, an error-free operation, and a high processing rate.

The setting of the room name contributes to effect a group display. Particularly, with the use of a third memory if the data fetched by the controller means are sequentially stored in the memory on a room name basis, and a room status display such that information about a room having the same name are displayed in a group is effected, the operating state of the appliances read from the information may be monitored at one time even if the appliances positioned in the same room may be connected to different controllers in the same room, substantially enhancing the usability of the system.

To effect the timer setting display, as a matter of course, the system needs be provided with a timer. This timer, whose operating time is set by the control means, controls the operating time of electric appliances which are corresponded to the timer by the control means.

The user instructs the control means to effect the display of the timer setting display. In response to an instruction from the console to display the timer setting display, the control means reads from the second memory data representing pictographs which depict one of the electric appliances, and outputs the data to the image composition means. The image composition means generates image data about the timer setting screen by the composition of data, which includes at least the data fetched from the second memory, from the control means.

Users selectively designate one of the pictographs appearing on the screen of the display means by the operation from the console. Moreover, users enter operating conditions of the timer from the console panel. Then, the control means sets the timer for the operating conditions entered.

The operations being set forth in the above may enable users to perform the setting of the timer with ease and prompt. Such advantageous operations are effected by the aforementioned display in the form of pictographs.

Assuming that a display indicating time set by the timer is known as a timer setting display, the display is caused in the following manner.

Users instruct the display of the timer setting display by the operation from the console. The control means, in response to an instruction from the console to display the timer setting display, reads from the second memory data comprising character data representing the operating conditions of the timer, and outputs the data to the image composition means. Then, the image composition means generates image data about the timer setting display by the composition of data, which includes at least the data fetched from the second memory, from the control means.

During the operation, users selectively designate a portion of the display appearing on the screen of the display means, and carry out the increment or decrement of the designated portional display by the operation from the console. This results in that the control means enters new operating conditions to the timer in such a manner that parameters of the operating conditions of the timer which correspond to the portional display designated from the console are replaced with parameters of a timer corresponding to the newly designated display, whereby displaying the operating mode of the timer, that is, OFF, SINGLE OPERATION. and CONSECUTIVE OPERATION.

Specifically, the console may need means for causing the operation of the timer to be held such that the control means, responsive to an instruction to hold the operation of the timer which is issued by the operation of users, temporarily holds the operation of the timer. With such a structure, it becomes possible to temporarily hold the operation of the timer with the setting of the timer suspended, and inform users of the temporary held state of the timer.

More preferably, with a plurality of timer setting areas, the operating condition of the plurality of electric appliances should be stored. Even in such a structure, in addition to the timer setting, the function to hold the operation of the timer can be effected.

To cause the display of the appliance display, the console may need means for effecting the display of the appliance display. Users instruct the control means to read data comprising character data representing appliance groups, pictographic data depicting the appliances, and character data representing a name of the room where the appliances are positioned, and output to the image composition means. The image composition means generates image data about the appliance screen representing the electric appliances and their position on an appliance group basis by the composition of data, which includes at least the data fetched from the second memory, from the control means.

This results in the display on the appliance group basis and the display, which includes pictographs, having superior visuality.

As a result, the contents of the timer setting may also be displayed on the room status display.

In such a configuration as described above, the contents of the pictograph should be changed depending on the current holding status of the plurality of setting areas of a timer. For instance, if the pictographs differ in each case, namely, the first case where all of the setting areas are set in temporary hold, the second case where a portion of the setting areas are set in temporary hold, and the third case where none of the setting areas are set in temporary hold, the visuality of the system is substantially enhanced. A greater improvement in visuality will be expected if the background color of the pictographs is also changed. Such processing is easily achieved by the use of a technique whereby data about pictographs are selectively read from the memory and outputted to the image composition means.

A setting menu screen is to enumerate a plurality of setting functions available in the visual controller. To effect the display of the setting menu, the console may need to have means for effecting the display of the setting menu display. When an instruction to display the setting menu is issued from the console panel by the operation of users from the console, the control means reads from the second memory data comprising character data representing a plurality of setting functions available in the visual controller, and outputs the data to the image composition means. The image composition means then generates image data about the setting menu display which enumerates in characters the setting functions available in the visual controller by the composition of data, which includes at least the data fetched from the second memory, from the control means.

Users select one of the setting menu displays appearing on the screen of the display means by positioning a cursor on a desired display. Responding to such a selection of the menu, the control means initiates the operation of routines corresponding to the setting menu selected from the control programs.

With the structure set forth in the above, users can cause the display of any desired setting menu. Moreover, as the setting menu, there are provided a room name setting and a timer setting. When users select one of these settings, the screen will be changed to the room name setting display or the timer setting display.

It is possible to recall the setting menu, room controller status screen, appliance status screen and the like while the function menu screen appears on the screen. In order to enable such a recall, the console needs be provided with means for instructing the control means to display the function menu display, and means for positioning a cursor on the screen of the display means.

When users instruct the control means to display the function menu screen by the operation from the console, the control means reads from the second memory data representing characters denoting the plurality of functions available in the visual controller, and outputs the data to the image composition means.

The image composition means generates image data about the function menu which enumerates in characters the functions available in the visual controller by the composition of data, which includes at least the data fetched from the second memory outputted from the control means.

If users position the cursor on the display means with further operation of the console, the control means in response to such an operation initiates the operation of routines at the cursor positioned among the control programs by means of a selection instruction. Routines about the aforementioned setting menu display, room status display, and appliance status display can be selected to be executed. Thus, the operability of the system is secured.

A security screen is also treated in the home bus system according to this invention. Being different from other displays, this screen forcibly appears on the display immediately when security sensors have sensed the occurrence of emergency such as fire, gas leak, trespassing or the like.

Such a forcible transition of the screen to the security display is effected in the following manner.

When the security sensor outputs an emergency, the control means reads from the second memory data representing characters which form a name of the room where the emergency has arisen and the security sensor positioned in the same room, pictographs depicting the sensor operation, and characters representing the name of the sensor, and outputs the data to the image composition means. The image composition means generates image data about the security screen representing the security sensor which is outputting the emergency by the composition of data, which includes at least the data fetched from the second memory, outputted from the control means.

The emergency display in the form of pictographs enables users to recognize the occurrence of an emergency without fail, thereby effecting a quick response to the emergency. In addition, the display of the room name easily allows users to know in which room the emergency has arisen.

If the console comprises a means for effecting the transition of the security screen to the room controller status screen, and if the control means performs an operation responding to the screen transition instruction, even while the security sensor is sensing the emergency, users can switch the security screen to the control screen, and control the appliances connected to a room controller in that room, and acquire security information about that room.

In operation, the control means, responsive to the transition instruction from the console, reads from the second memory data representing characters forming a name of the room having a room controller to which the alarming security sensor s connected, photographs depicting electric appliances connected to the room controller, characters representing the operating state of the appliances, and characters representing the emergency, and outputs the data to the image composition means.

Then the image composition means generates image data about the room status representing the operating state of the appliances on a room controller basis and the emergency by the composition of data, which includes at least the data fetched from the second memory, outputted from the control means.

Eventually, users can switch the security screen to the control screen, control the electric appliances connected to the room controller, and acquire the security information.

The security information may be displayed either in the form of characters or pictographs. The use of different pictographs depending on the contents of emergency sensed by the security sensor results in a large improvement in visuality. Blinking the pictographs may alert users, which is preferable in view of security.

In the case where a plurality of security sensors output emergencies at one time, the control means performs the reading of data from the second memory and outputting of the data to the image composition means alternatively for every security sensor in alarm at a given periodicity. The image composition means generates image data about the security display representing the emergency output of the security sensor by the composition of data, which includes at least the data fetched from the second memory, outputted from the control means.

As a result, users can be informed without fail of all emergencies even if a plurality of emergencies have arisen at one time.

BRIEF DESCRIPTION OF THE DRAWINGS

Still further objects and advantages of the invention will be apparent from the following detailed description and claims and from the accompanying drawings illustrative of the invention wherein:

DESCRIPTION OF THE PREFERRED EMBODIMENTS

Referring to the accompanying drawings, detailed description will be given of an embodiment according to this invention.

Figure 1:
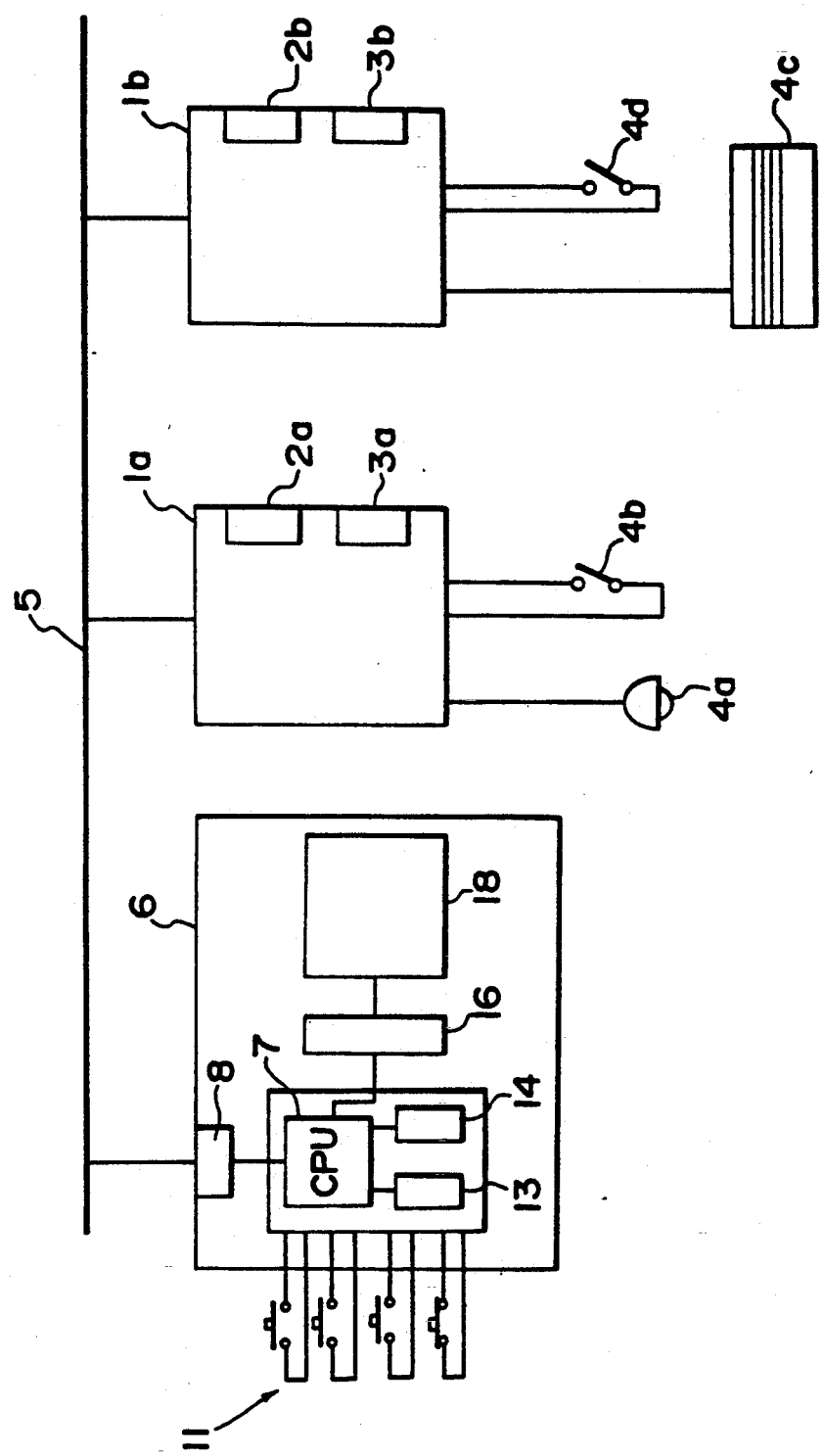
FIG. 1 is a schematic representation showing the structure of a home bus system according to one embodiment of this invention.

FIG. 1 shows the structure of the home bus system according to one embodiment of the invention. As shown in FIG. 1, the home bus system comprises room controllers 1a and 1b linked to a visual controller 6 via a home bus 5. In FIG. 1, although two room controllers are used by way of example in the embodiment, the number of the room controllers is never limited to two in this invention.

The room controller 1a is provided with a device 2a for setting the room controller s number and a device 3a for setting the name of the location where the room controller is positioned. Likewise, the room controller 1b is provided with a device 2b for setting the room controller's number and a device 3b for setting the name of the location where the room controller is positioned. The number setting devices 2a and 2b are members, such as switches, for numbering the room controllers 1a and 1b. respectively. The name setting devices 3a and 3b are members for entering the name of the locations where the room controllers 1a and 1b are positioned.

The room controller 1a is further provided with electric appliances 4a and 4b connected to the same, and the room controller 1b is further provided with electric appliances 4c and 4d connected to the same. The room controllers are electrically connected to the appliances via non-illustrated terminals. The electric appliance 4a is an electric light; 4c, an air-conditioner; 4b, a security sensor for sensing trespassers; 4d, an emergency switch, or one type of security sensor, for example. The room controller 1a monitors the operating state of the appliances 4a and 4b, and the controller 1b monitors those of the appliances 4c and 4d.

The visual controller 0 has a CPU 7 incorporated therein. The CPU 7 controls the operation of the entire visual controller 6, communications between the visual controller and the room controllers 1a, 1b, and the display of a screen. FIG. 1 shows the structure of the visual controller 6 with a portion thereof omitted. FIG. g shows the more detailed structure of the visual controller of FIG. 1.

Figure 2:
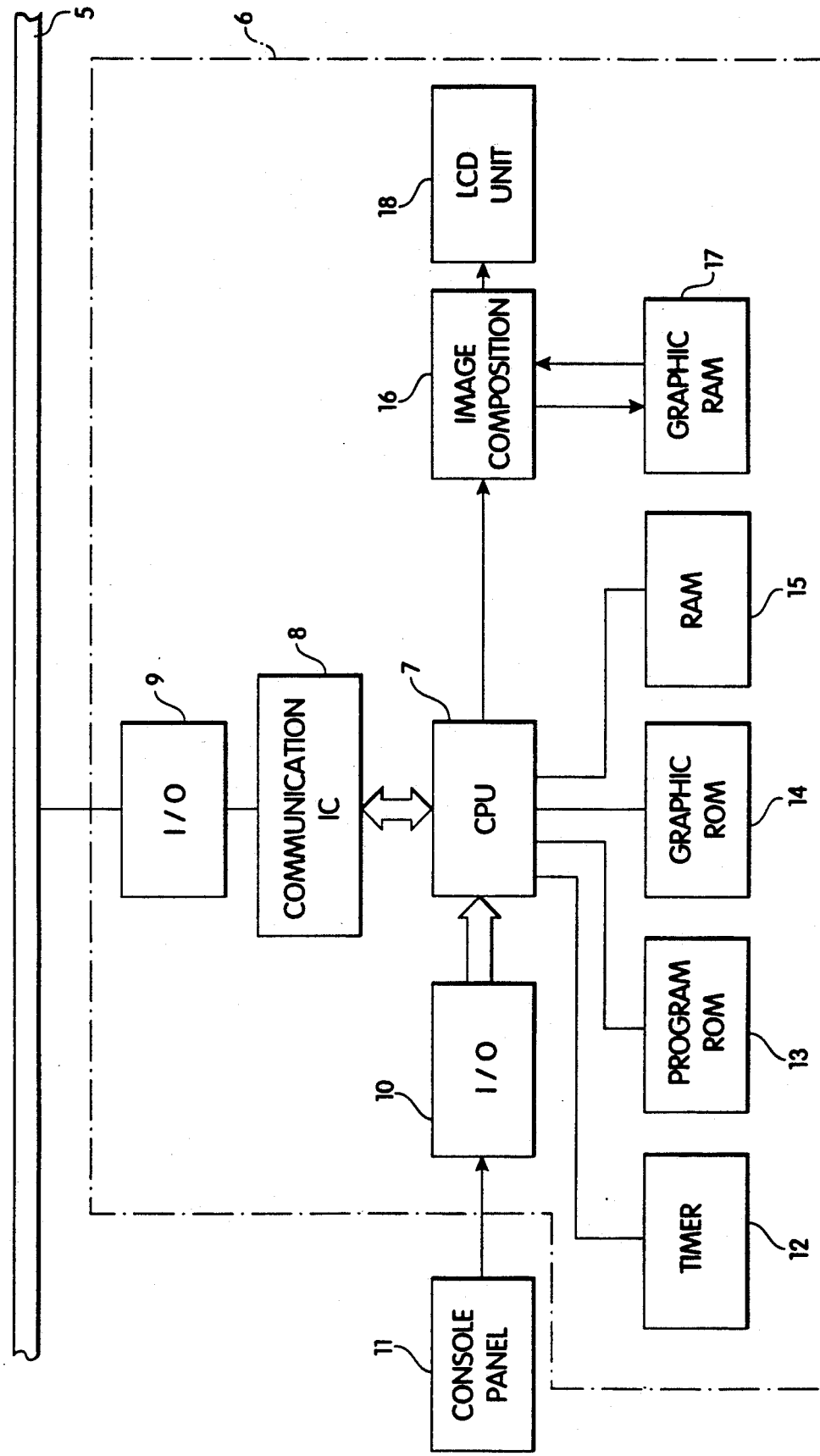
FIG. 2 is a block diagram showing the hardware configuration of a visual controller exemplified in the embodiment.

As shown in FIG. 2, the CPU 7 is connected to a home bus S via a communication IC 8 and an I/O interface 9. The communication IC 8 converts transmission signals, which are transferred from the room controllers 1a and 1b through the home bus 5 into received data. An I/O interface g transforms the waveform of the transmission signals before they are received by the communication IC 8.

The CPU 7 is connected to the console 11 through an I/O interface 10. The I/O interface 10 supplies to the CPU 7 data responsive to the contents of the console 11, the console 11 enabling users to enter instructions such as the contents of the control and the like required when operating the system.

The CPU 7 is connected to a timer 12, program ROM 13, graphic ROM 14, RAM 15, and a picture composition IC 16.

The timer 12 is capable of setting the ON/OFF time of any of the respective appliances, eight appliances, for instance.

The program ROM 18 stores programs, or control programs which are necessary to operate the system.

The graphic ROM 14 store pictographs depicting each appliance, characters representing the operating state of each appliance, and data about a background color. This graphic ROM 14, if necessary, stores a room name, characters representing the room name, pictographs depicting the security displays, and characters representing the pictographs for use in security display. The pictographs for security display use are a pictorial graphic for depicting an emergency sensed by the security sensor.

The RAM 15 stores several data such as the ON/OFF times of the electrical appliances set by the timer 12 and the like, required in the system.

The image composition IC 16 generates images pictographs, characters, and background colors, and displays them on the screen of an LCD 18. The image composition IC 10 is connected to a graphic RAM 17, and image data produced by the IC 10 are temporarily stored in the graphic RAM 17. If the security sensor outputs an emergency, pictographs for security display use, a room name, and characters corresponding to the pictographs must be generated by the image composition IC 10.

Figure 3:
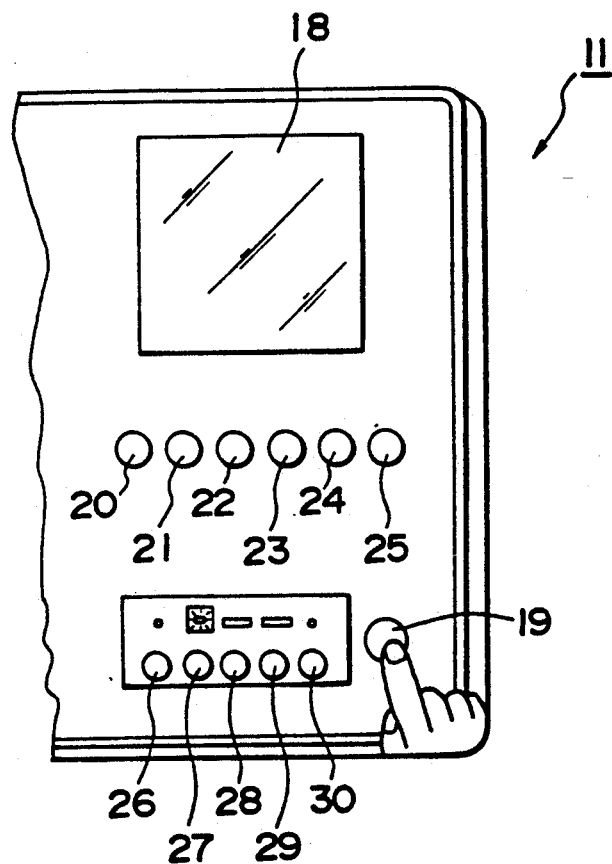
FIG. 3 is a partial schematic representation of a console panel exemplified in the embodiment.

FIG. 3 shows the structure of the console panel 11. As shown in FIG. 3, the console 11 is composed of a function menu key 19, arrow keys 20 and 21, an operation key 22, a switch key 23, a monitor key 24, an electrical lock key 25, a menu key 26, a selection key 27, a cancel key 28, a memory key 29, and an initialization key 30.

The function key 10 serves to display a screen representing select control and display functions. The arrow keys 20 and 21 allow users to effect the movement of a cursor positioned on the screen of the LCD unit.

The operation key 22 serves to terminate the function menu and erase the screen while the function menu screen appears, the selection of a room name and the like, and the entering of instructions to hold the setting of the timer 12.

The operation of the visual controller 6 being subject to the hold operation consists of three modes, that is, an OFF mode, a SINGLE operation mode, and a CONSECUTIVE operation mode.

The switch key 23 is used when setting a room name or the like. The monitor key 24 is used to display images monitored on the screen of the LCD unit 18. The electrical lock key 25 instructs the execution of electrical locking. The menu key 28 is to change the screen to the setline menu. The selection key 27 is to select a timer setting and a room name setting from the setting menu. The cancel key 28 is to cancel the operations entered from the operation key 22. The memory key 29 is to store data in the RAM 15. The initialization key 30 is to reset the system to its initial state.

The operation of the home bus system according to the embodiment will be explained hereinbelow.

The home bus 5 allows data transmission between the room controllers 1a, 1b and the visual controller 6. In operation, data are transferred from the room controllers 1a and 1b to the visual controller 6. The operation data represent the operating state of the electric appliance 4a and the like. The waveform of the signal transmitted from the room controllers 1a and 1b is transformed by the I/O interface 9, then the signal is inputted to the communication IC 8. The communication IC 8 converts the transmission signal into received data by changing the speed of the transmission signal from a transmission line speed to the speed of the visual controller 8. The received data is supplied to the CPU 7. which the CPU 7 writes the received data into the RAM 15 in accordance with the control program stored in the program ROM 13.

The key operations of the console 11 effect operations for several settings. As described above, the console 11 is provided with several keys, and the I/O interface 10 supplies signals, responsive to the key operations, to the CPU 7. The CPU 7 executes predetermined operations under the control of the control program in response to these signals. The CPU 7 writes data to the RAM 15 in response to the signal from the console 11; fetches data about pictographs and characters stored in the graphic ROM 14 with reference to the contents of the RAM 15; and supplies the data fetched from the graphic ROM 14 to the image composition IC 10 so as to generate composite images. The image composition IC 18 performs the generation of composite images, storage of the images into a serial graphic RAM, and the display of the images on the screen of the LCD unit 18.

The principle operations of the home bus system according to this invention; namely, the transmission of data, the entry of data from the console 11; and the composition and display of images will be evident from the description being set forth in the above. On the basis of these operations of the home bus system, featured operations of this invention will be described hereinbelow. The following descriptions are given specifically in view of the correlation between users' operation from the console and resultant screen displays. Unless otherwise specified, the CPU 7 performs the execution of the principle operations set forth in the above in combination.

Figure 4:
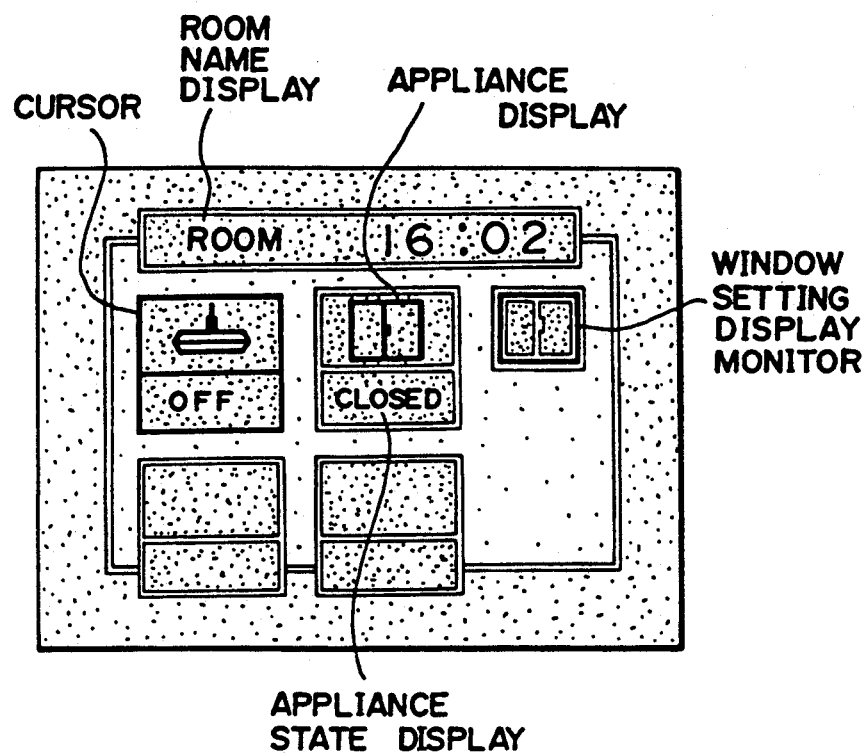
FIG. 4 is a schematic representation of a room status screen exemplified in the embodiment.

FIG. 4 shows an example display of the room status screen. On the screen appear a room name indication consisting of characters "western style room". a time indication consisting of numerals "16:02" an appliance indication consisting of pictographs, an appliance status indication "OFF" and "CLOSED" denoted below the pictographs, and a setting status indication of the window monitor. The room status display does not involve any information about security sensors. In the drawing, the indication with a black frame depicts a cursor, and the pictographs and background of the appliance status indication are painted in a predetermined color. For instance, the background will be in pink, blue, red, and green at each state; namely. "CLOSED" or "ON". "OPEN" or "OFF". "OUT OF OPERATION" and "IN OPERATION" respectively.

The contents of the room status display are changed in accordance with changes in the operating state of the electric appliance, that is, the ON/OFF, and OPEN/CLOSED states. Such a change in the room status display is effected by the signal transmission through the home bus and the consecutive recurrence of image generation in response to the signal. In practice, the real time display of the room status screen can be effected by the iterative composition of images with operations such that the CPU 7 acquires received data consecutively and rewrites the contents of the RAM IS.

In order to alternate the settings of the pictographs corresponding to an appliance or a room name while the room status display appears on the screen, all users have to do is to operate the keys of the console 11.

When the function menu key 19 is turned on during the room status display, under the control of the control program stored in the program ROM 13 are effected the output of a signal from the I/O interface 10; the storage of data into the RAM 15; the reference to the RAM 15; the acquisition of data from the graphic ROM 14; the composition of images; and the display of images. The data to be composed are character data representing the ROOM STATUS CONTROL, PATTERN CONTROL, APPLIANCE STATUS CONTROL, SETTING MENU, and BACKGROUND COLOR. Consequently, what is displayed on the screen of the LCD unit 18 is a FUNCTION MENU display including characters representing the ROOM STATUS CONTROL, PATTERN CONTROL, APPLIANCE STATUS CONTROL, and SETTING MENU.

Among the characters involved in the FUNCTION MENU display, the characters representing the "ROOM STATUS CONTROL", "PATTERN CONTROL", "APPLIANCE STATUS CONTROL", and "SETTING MENU" are responsive to the operation of the system. For instance, when wishing to set the name of room, pictographs, and the timer, users designate the setting menu by moving the cursor. In order to effect the room status display, users designate the ROOM STATUS CONTROL with cursors. To effect the appliance group display, users designate the "APPLIANCE STATUS CONTROL" with cursors.

The operation in setting the name of a room will now be described. When setting a room name, users move the cursor to the SETTING MENU. The cursor is moved by users' operation of the arrow keys. With the operation of the arrow keys 20 and 21 by users and the pressing of the operation key 22, the system enters the control and display operation at the cursor position.

Figure 6:
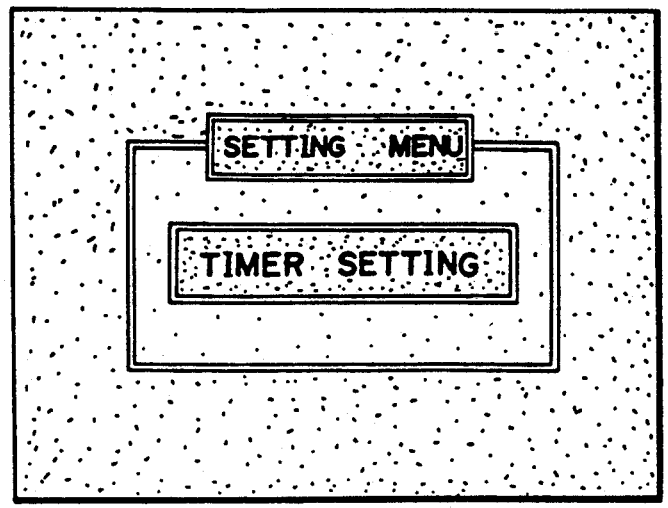
FIG. 6 is a schematic representation of a setting menu exemplified in the embodiment.

In this case, the next screen has the setting menu screen illustrated in FIG. 6. This display has the characters "TIMER SETTING". By the operation of the key 22, the screen display changes in sequence: PATTERN SETTING, TIME SETTING, MARK SETTING, ROOM NAME SETTING, and finally returns to the TIMER SETTING. The TIMER SETTING is to select the setting of an appliance to be controlled by the timer control and set operating times thereof; the PATTERN SETTING, to effect the setting of an appliance which undergoes pattern control; the TIME SETTING. to make the correction of a time; the MARK SETTING. to alter a mark of appliance display; and the ROOM NAME SETTING, to change the name of a room to be displayed. If users press the switch key 23 while the ROOM NAME SETTING appears on the screen, the CPU 7 writes data responsive to a signal sent by the operation of the switch key 23 from the I/O interface 10 into the RAM 15 under the control of the control program. The CPU 7 instructs the image composition IC 16 to compose images in accordance with its principle operation described before. Thus composed images are stored in the graphic RAM 17, and once stored images are then displayed on the screen of the LCD unit 18. Upon completion of these operations, the next screen will have the ROOM NAME SETTING DISPLAY on any of the rooms.

Figure 7:
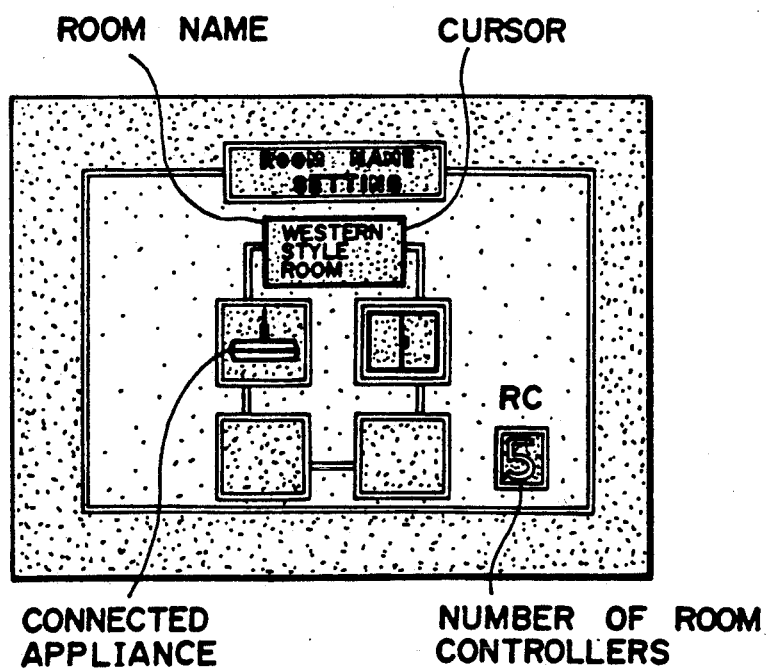
FIG. 7 is a schematic representation of a room name setting screen exemplified in the embodiment.

FIG. 7 shows one example of such a display on one specific room. In this screen are displayed characters representing a room name and appliances, and pictographs depicting the appliances.

While the room name setting screen appears on the screen, the screen changes in the sequence of the next room and a room subsequent to the next room by the operation of the key 22. In the same manner as the room name setting display is changed, the above operations are executed with a combination of the foregoing principle operations.

Figure 8:
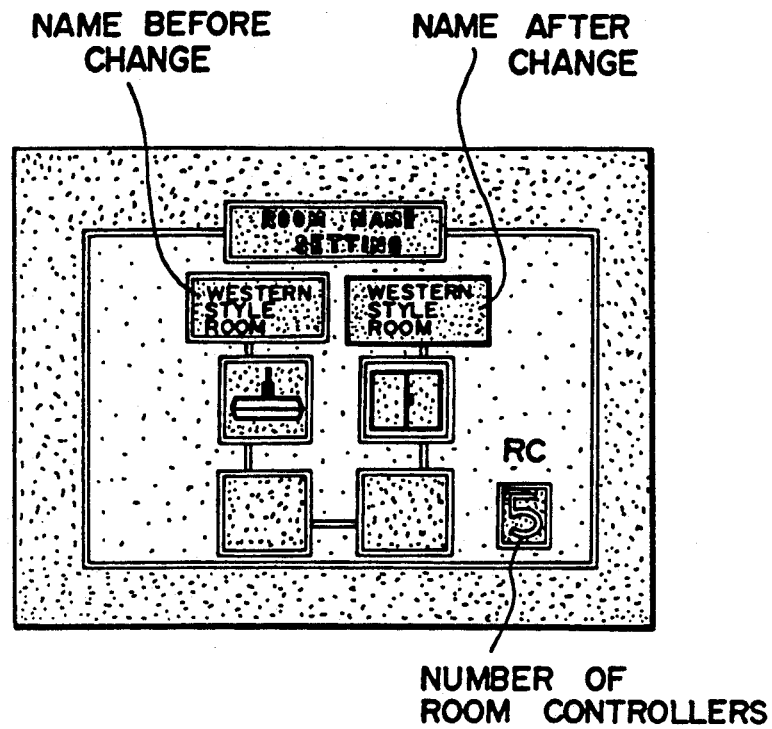
FIG. 8 is a schematic representation of the room name setting screen of FIG. 7 which is being reset.

All users have to do is to operate the switch key 23 while a room name whose name is to be set appears on the screen. The I/O interface 10 produces an output of a signal in response to the operation of the switch key 23 so as to change the screen display to a display as shown in FIG. 8. On the changed room status display, appear characters of the room name before undergoing any change and characters for a possible new room name. The room name options on the display change in sequence with the key 22. Users press the memory key 29 when a desired room name appears on the screen. The I/O interface 10 sends a signal to the CPU 7 in response to the operation of the memory key 29. The CPU 7 stores the selected name into the RAM 15 as being the new room name. Thereafter, this new room name is displayed whenever the room status display is called.

Likewise, pictographs are also set with the cursor and the key 22. While the function menu appears on the screen, the function at the cursor position is executed with the operation key 22 by positioning the cursor with the arrow keys 20 and 21. If the cursor is positioned at the "PATTERN SETTING" the setting of an appliance which undergoes pattern control is efftected. If the cursor is positioned at the "TIME SETTING". the correction of time is executed. In the case of the "MARK SETTING". a mark of the appliance display is changed.

Thus, according to this invention, indicating the operating state of the appliances by the pictographs, character displays, and background color in combination allows users to grasp the ON/OFF or OPEN/CLOSED state of the appliances readily, improving the operability of the appliances. This advantage is obtained with the use of the graphic ROM 14 and the like. The settings of the appliance status control are executed with simple operations.

In the case where a plurality of appliances are provided in one room, each room controller is given a different room name, and the data of the controllers are combined together. Specifically, room names "WESTERN STYLE ROOM 1" and "WESTERN STYLE ROOM 2" are assigned to two room controllers positioned in one western style room Conducting the operations shown in FIGS. 7 and 8, the room controller having the name of "WESTERN STYLE ROOM 1" is changed and registered as a "WESTERN STYLE ROOM", and the room controller having the name of "WESTERN STYLE ROOM 2" is also changed and registered as the "WESTERN STYLE ROOM". As a result, the changed settings are registered in the RAM 15 as data. The graphic composition IC 16 generates images from the data, then the appliances designated by the name of "WESTERN STYLE ROOM" appear on the room status display basis, that is, a group display basis, on the screen of the LCD unit 18. As a result, the operating state of the appliances connected to different room controllers in the same room are observable on a screen display.

According to this embodiment, the CPU 7 effects paging If the number of picture frames where the appliances are indicated is insufficient when causing a group display, a plurality of display screens are assigned to a single room name, and the screens are paged with the arrow keys 20 and 21. In grouping the appliances, the CPU 7 makes a decision as to whether or not the allotment is proper, and executes the control of display paging.

Further, since the home bus system according to this invention is provided with the timer 12, the electric appliances can be controlled by the settings of the timer 12.

Figure 9:
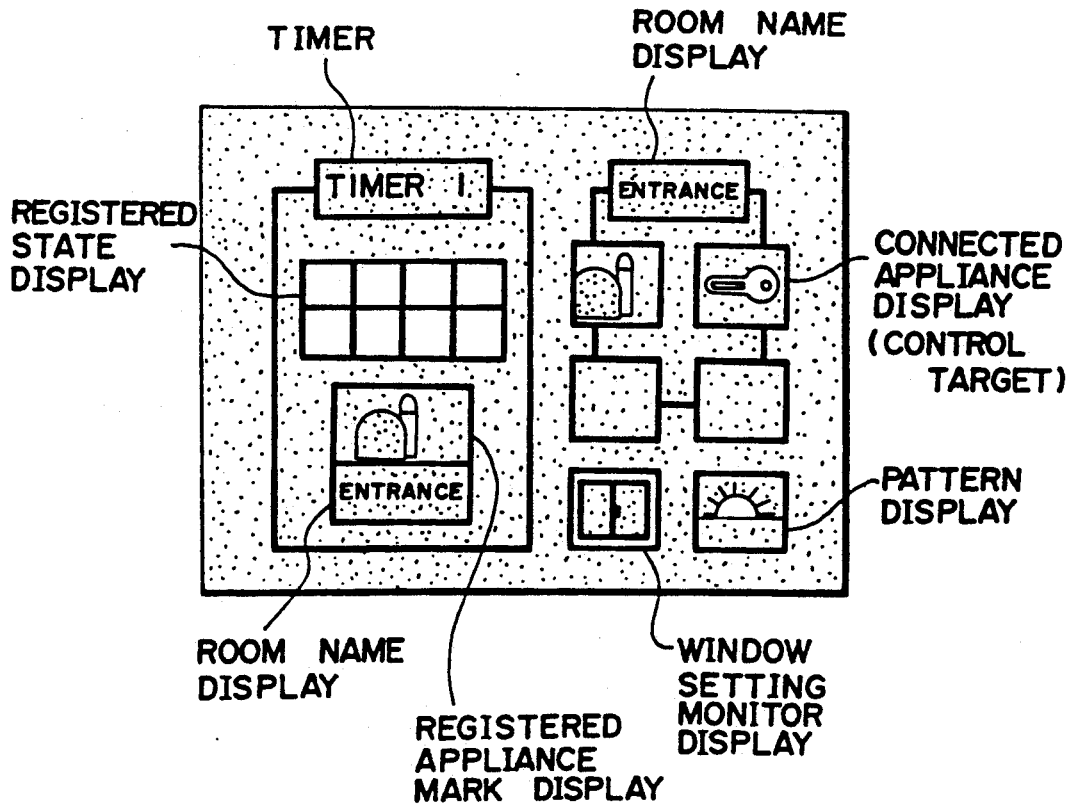
FIG. 9 is a schematic representation of a timer setting screen exemplified in the embodiment.

If users try to set the ON/OFF time of the appliance, operating the operation key 22 during the setting menu screen as shown in FIG. 6 and pressing the switch key 23 while "TIMER SETTING" is on the screen will result in the appearance of the display shown in FIG. 9 in accordance with the principle operations described before.

The display contains the timer display illustrating which one of the eight areas is now being set. Users of the system position the cursor at the timer display with the arrow keys 20 and 21 when setting the timer. While the cursor is positioned at the timer display, the operation of the operation key 22 results in the appearance of a next screen having a display, for example a TIMER 2, concerning another setting area.

The users of the system who perform the timer setting position the cursor at the room name display on the right of the timer display with the arrow keys 20 and 21. The room name display consists of characters, such as ENTRANCE, descriptive of the room name where the appliances are positioned. If users operate the operation key 22, the room name display changes to a room name display which represents another room.

Next, the users position the cursor at a connected appliance display using the arrow keys 20 and 21. The connected appliance display is pictographs depicting appliances connected to the room controller positioned in the room designated by the room name display. When the operation key 22 is pressed after having moved the cursor to the connected appliance designating a desired appliance, the appliance at the cursor is selected as needing to be controlled by the timer 12, or in more detail, by the setting area displayed on the timer display after the ON/OFF or CLOSED/OPEN has been changed and the selection key 27 has been depressed.

As a result, a display which represents the room and appliances designated by the cursor appears in the room name display and the registered appliance mark display below the timer display areas. In addition, below the timer display a registration status display appears which represents the current state of each setting area, and below the connected appliance display a window monitor setting display and a pattern display appear.

As with the loads, the pattern display is selected as a timer setting by pressing the select key 27. The contents of the appliance such as ON/OFF or OPEN/CLOSED state are stored in the RAM 15 under the control of the CPU 7 by pressing the memory key 28. Responding to the storage of the data into the RAM 15, the composition of a new display is initiated, and the screen of the LCD unit 18 is changed to a timer setting display.

Figure 10:
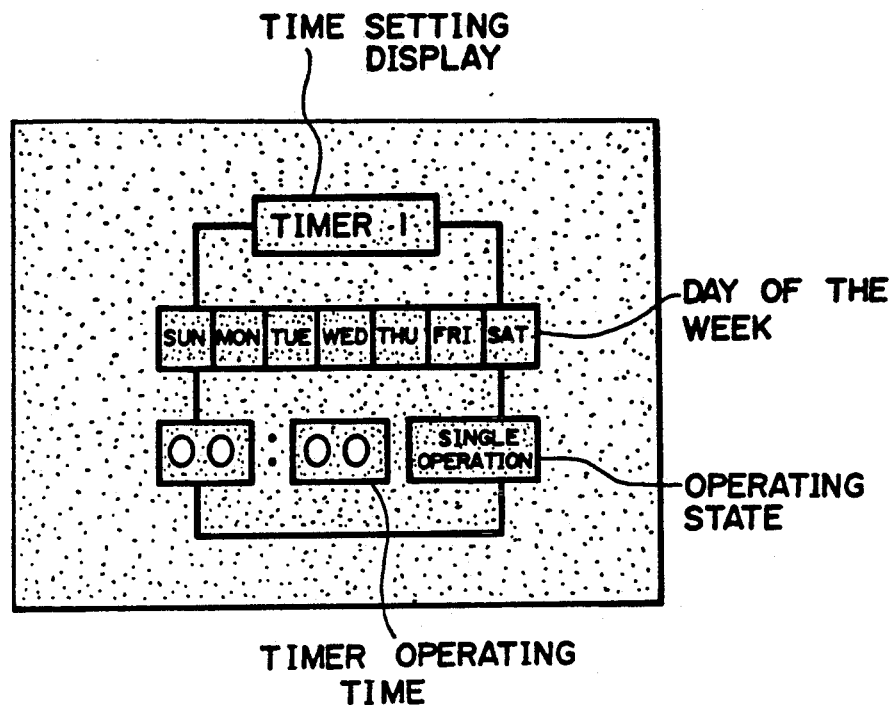
FIG. 10 is a schematic representation when the timer of FIG. 9 is being set.

FIG. 10 shows an example of the time setting display of a timer. This timer setting display consists of a timer name display having the characters "TIMER 1". a date display having characters such as "DATE". a timer operating time display having characters which represent the time when the setting area which corresponds to the timer 12 is to be activated, and an operating status display having characters representing the operating state of the setting area which corresponds to the timer 12.

A plurality of days on the week may be selected, as well as the cancel of the selected day can be effected by repeating the operation of the operation key 22 with the cursor positioning at the selected day.

In such a state, each time the cursor is positioned at one of dates with the arrow keys 20 and 21, and the operation key is operated, it is possible to change a date for activation of the timer 12 one by one. Here, a cursor of the time setting display may be shifted every digits. If the cursor is positioned at the operating status display with the arrow keys 20 and 21, the operating mode of the timer 12 is selected and specified by the operation of the key 12. There are three operating modes, namely an OFF mode to hold registered operations: a SINGLE OPERATION mode for executing the operations only once; and a CONSECUTIVE OPERATION mode to execute the operations successively By pressing the memory key 29 after having made the selections mentioned above, the selected contents are stored in the RAM 15 under the control of the CPU 7.

Thus, the recurrence of the above operations in sequence enables all eight areas to be registered.

Figure 5:
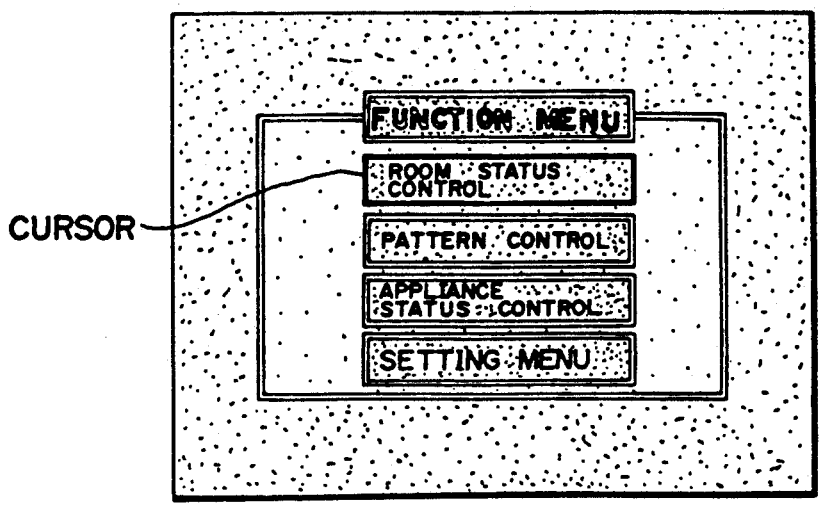
FIG. 5 is a schematic representation of a function menu screen exemplified in the embodiment.
Figure 11:
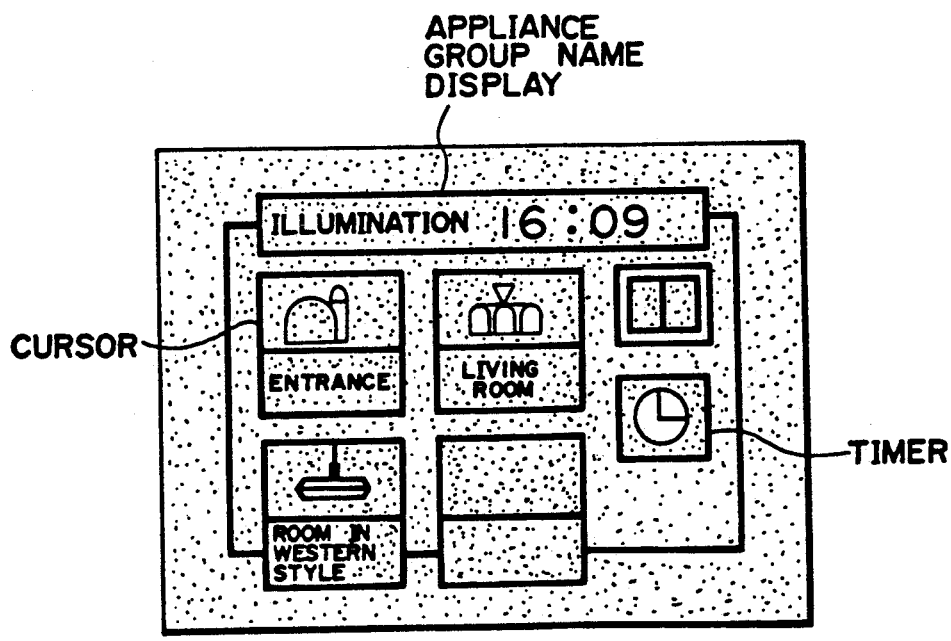
FIG. 11 is a schematic representation of an appliance status screen exemplified in the embodiment.

After this registration, the screen of the LCD 18 automatically shifts, in response to the operation with the memory key 29, to a next screen having the function menu screen shown in FIG. 5. By positioning the cursor at the APPLIANCE STATUS DISPLAY and operating the operation key 22, the next screen will have the appliance status display screen as shown in FIG. 11. This screen has the appliance group status display including the characters "ILLUMINATION 16:09" as well as the timer display.

Figure 12A:
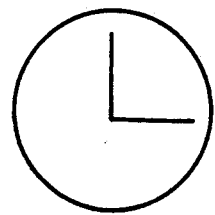
FIG. 12A is a schematic representation of one type of pictograph of the timer of the appliance status screen of FIG. 11.
Figure 12B:
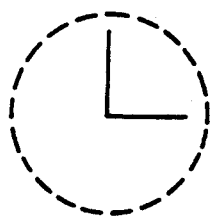
FIG. 12B is a schematic representation of another type of pictograph of the timer of the appliance status screen of FIG. 11.
Figure 12C:
FIG. 12C is a schematic representation of still another type of pictograph of the timer in the appliance status screen of FIG. 11.

In the examples of the display shows a case where the timer display includes a watch-like display as shown in FIGS. 12A-12C. FIG. 12A is the timer display (setting display) appearing during a display about the SINGLE OPERATION mode or the CONSECUTIVE OPERATION mode on the screen. FIG. 12B is the timer display (partial hold display) appearing while a display about the OFF mode is displayed in one of the setting areas of the timer 12. FIG. 12C is the timer display (entire hold display) while a display about the OFF mode is displayed at all of the setting areas in the timer 12. With these display formats, users can know whether or not the OFF mode has already been set and the current state of the settings. The use of different background colors depending on each display, that is, the setting display, the partial hold display, and the entire hold display, enhances the visuality of the system.

In the case the security sensor output showing the occurrence of an emergency, the CPU 7 forcibly changes the screen to the security screen. Such a screen change is effected by setting the operations of the CPU 7, namely: storing into the RAM 15 data about the security display in response to the output from the security sensor under the control of the control program: fetching data from the graphic ROM 14 with reference to the contents of the RAM 15; and generating composite images based on the data by the graphic composition IC 16.

Assume that the emergency switch 4d serving as the security sensor detected an emergency. In this case, the room controller 1b corresponding to the emergency switch 4d transmits data about the detection of the emergency by the emergency switch 4d as a transmission signal along the home bus 5. Upon receipt of the transmission signal as received data at the CPU 7 via the I/O interface 9 and the communication IC 8, the CPU 7 writes the data into the RAM 15 under the control of the control program.

The CPU 7 instructs the image composition IC 18 to generate the display of the security display under the control of the control program. More specifically, referring to the data written into the RAM 15, the CPU 7 fetches data from the graphic RAM 14, and supplies the data to the image composition IC 16. The thus fetched data consists of data representing security display characters and characters representing a room name. The image composition IC 18 temporarily stores the produced images in the graphic RAM 17 and supplies the once stored images to the LCD unit 18 so as to indicate the security display as shown in FIG. 13 on the screen of the LCD unit 18.

Figure 13:
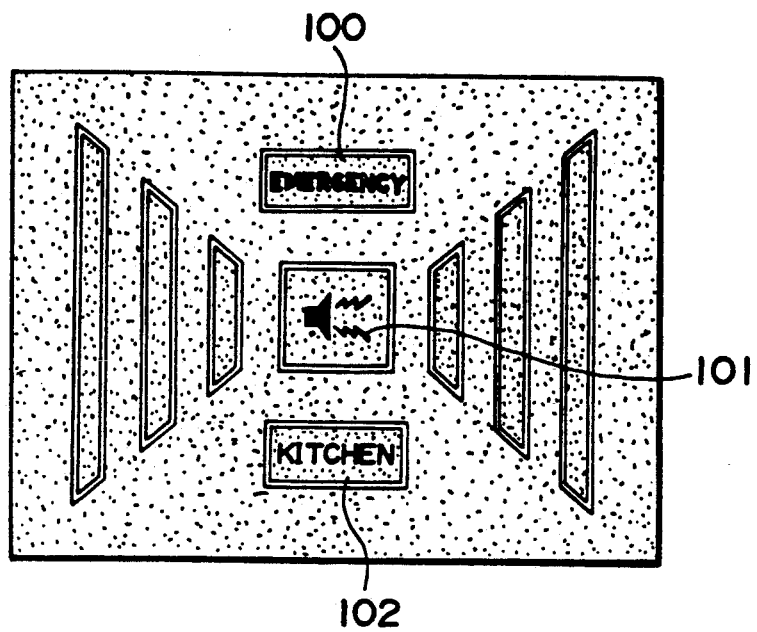
FIG. 13 is a schematic representation of a security screen exemplified in the embodiment.

There appears in the security screen as shown in FIG. 13, a security display 100 comprising the characters EMERGENCY, a security display 101 comprising pictographs which depict an alarm, and a room name display 102 comprising the characters WESTERN STYLE ROOM which represents the name of the room where the emergency switch 4d is provided.

Figure 14:
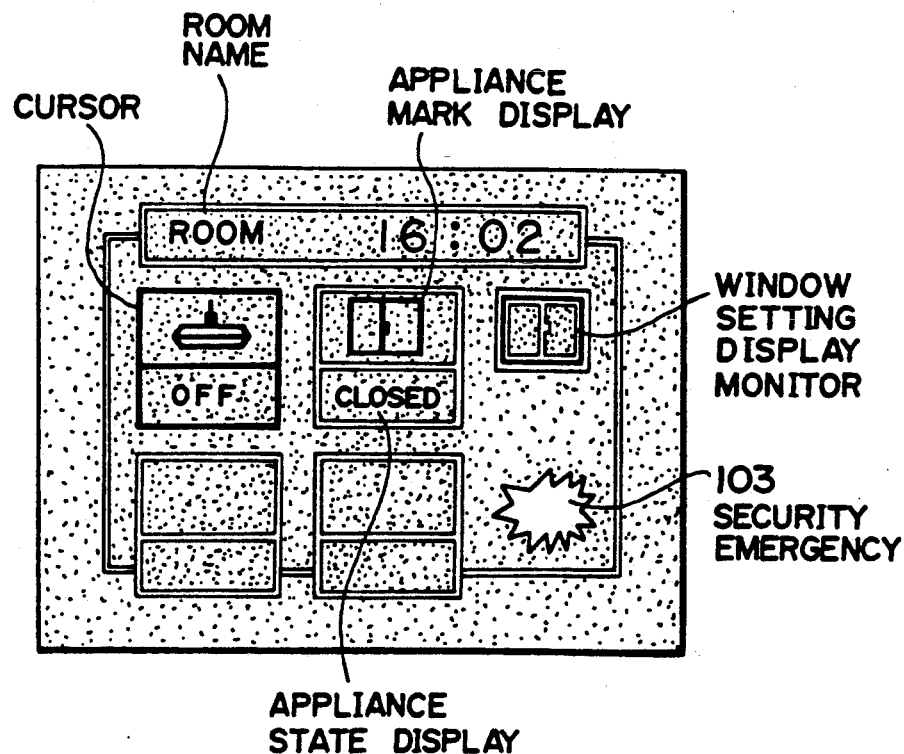
FIG. 14 is a schematic representation of the room status screen of FIG. 4 when the security sensor is reporting an emergency.

During the appearance of the security display, users can request the display of the room status screen on the screen of the LCD unit 18. Users operate the function menu key 19, arrow keys 20 and 21, and the operation key 22. If the function menu key 10 is operated while the security screen is being displayed, the next screen of the LCD unit 18 has the function menu screen display as shown in FIG. 5. Thereafter, the cursor is positioned at the ROOM STATUS CONTROL with the arrow keys 20 and 21, and the operation key 22 is pressed, whereby the next screen has the room status display screen as shown in FIG. 14 on the basis of the operations mentioned before.

However, while the display of security abnormality appears, the pressing of the function menu key 10 results in the recall of the security screen.

Figure 15:
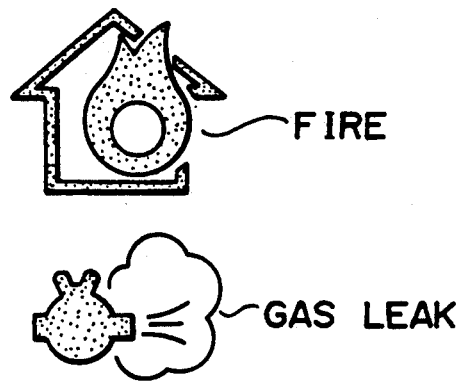
FIG. 15 shows pictographs to be displayed on the room status screen when the security sensor is sensing the occurrence of an emergency.
Figure 15:
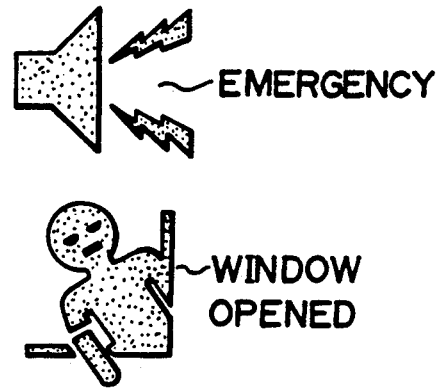

Being different from the common room status display screen, this room status display screen comprises a security abnormality display 103. The security abnormality display 103 is a pictograph showing the occurrence of emergencies For instance, as shown in FIG. 15, pictographs may be different from each emergency, that is, a fire, gas leak, alarm, window opened, and the like. As long as users can notice the occurrence of an emergency, a character display may also be usable. Here, blinking the security display may result in an improvement of the visibility.

In the home bus system according to this invention, partly since the security display can be changed to the room status display, partly since a room name appears on the security display screen, and partly since the security abnormality display appears on the room status display screen, the operability of the system in case of an emergency can be enhanced.

If a plurality of security sensors provided in different rooms, for example the security sensors 1b and 1d, sense emergencies at one time, the CPU 7 instructs the image composition IC 16 to generate a security display concerning either of the security sensors and to store the thus produced display in the graphic RAM 17 so as to display the images on the screen of the LCD unit 18. After a few seconds, the CPU 7 instructs the other sensors to be displayed in the same manner. The CPU 7 effects the recurrence of the alternate security sensor display every few seconds until the number of the security sensors in operation is reduced to one due to the cancellation of the emergency state.

While a plurality of sensors are sensing emergencies at one time, users can change the screen to the room status display by operating the function menu key 10, arrow keys 20 and 21, and operation key 22 in the manner as described before. If more than three security sensors detect emergencies concurrently, the CPU 7 executes the alternate display of the emergencies detected at the three sensors.

According to this invention, even if a plurality of security sensors detect emergencies concurrently, all emergencies may be displayed, thereby improving the usability of the system.

Although the home bus system according to this invention employs the LCD unit 18 to indicate the displays, an external monitor such as a television receiver may also be used.

Thus, in the home bus system according to this invention, since the operating state of the appliances are indicated using a combination of pictographs, characters, and back ground colors, users can readily discern whether the appliance is ON or OFF and OPEN or CLOSED, enhancing the operability of the home bus system. Further, because of the group display, the usability of the system is substantially improved.

In addition, according to this invention, when changing from week ends to week days, and vice versa, the settings of the timer can be maintained, thereby saving labor when resetting the timer.

Furthermore, according to this invention, partly since the security display can be changed to the room status display, partly since the room name appears on the security display screen, and partly since the security abnormality display appears on the room status display screen, the operability of the home bus system in the case of emergency can be greatly enhanced.

The invention has been described in detail with particular reference to certain preferred embodiments thereof, but it will be understood that variations and modifications can be effected within the spirit and scope of the invention.

What is claimed is:

1. A home bus system comprising;
    (a) a predetermined number of room controllers, at last some of which are connected to a plurality of loads, such as electric appliances and security sensors, for monitoring the operating state of the loads, and for outputting a signal concerning the operating state of the loads
    (b) a visual controller for driving a display screen in response to the signal from one of the room controllers, the visual controller comprising:
    a console having a predetermined number of keys,
    a first memory for storing one or more control programs,
    a second memory for storing a predetermined amount of data representing pictographs, background colors, and characters,
    control means responsive to at least either a signal from the console or a signal from the room controller under the control of the control programs for selectively fetching data stored in the second memory, and for outputting the fetched data,
    image composition means for generating image data by a composition of data, which include the data fetched from the second memory, outputted from the control means, and
    display means for displaying on a screen the generated image data; and
    (c) a home bus for coupling the room controllers and the visual controller and for supplying the signals from the room controllers to the visual controller.

2. A home bus system according to claim 1, further comprising a third memory for storing the data fetched by the control means.

3. A home bus system according to claim 1, further comprising a fourth memory for temporarily storing the generated image data.

4. A home bus system according to claim 1, further comprising a first interface for receiving the signal outputted rom the room controller by way of the home bus and supplying the received signal to the control mans as data.

5. A home bus system according to claim 1, further comprising a second interface responsive to key operations of the console for supplying data to the control means.

6. A home bus system according to claim 1, wherein the console has means for instructing the control means to display a function menu, and means for setting a cursor position on the screen of the display means; the console means has means responsive to the display instruction of the function menu from the console for reading from the second memory data comprising character data which represent a plurality of functions available in the visual controller, and outputting the data to the image composition means, and means for initiating the execution of routine operations at the cursor among the control programs; and the image composition means generates image data about the function menu display in which the functions available in the visual controller are enumerated in characters by the composition of data, which include at least the data fetched from the second memory, outputted from the control means.

7. A home bus system according to claim 6, wherein the console has
    means for effecting the display of an appliance display,
    means for instructing the control means to display a setting menu, and
    means for effecting the selection of the setting menu appearing on the screen of the display means;
    the control means has
    means for, in connection with one of the room controllers, reading from the second memory data comprising character data which represents the name of the room corresponding to the room controller, pictograph data which depict loads connected to the room controller, and character data which represents the operating conditions of the loads connected, and outputting the data to the image composition means,
    means responsive to the display instruction of the appliance display from the console for reading from the second memory data comprising character data which represents load groups, pictograph data which depicts the loads, and character data which represents the name of the room where the loads are positioned, and outputting the data to the image composition means,
    means responsive to the display instruction of the setting menu for the console for reading from the second memory data comprising character data which represent the plurality of setting functions available in the vision controller, and
    means for initiating the execution of routine operations at the cursor among the control programs; and
    the image composition means has
    means for generating image data about the room status display which represents the operating state of the loads for each room controller by the composition of data, which include at least the data fetched from the second memory, outputting from the control means,
    means for generating image data about a function status display which represent the loads and their positions for each load by the composition of data, which includes at least the data fetched from the second memory, outputted from the control means, and
    means for generating image data about the function menu in which the setting functions available in the visual controller are enumerated in characters by the composition of data, which includes at least the data fetched from the second memory, outputted from the control means.

8. A home bus system according to claim 1, wherein the control means reads from the second memory data comprising at least character data representing the name of a corresponding room. pictograph data depicting the loads connected, and character data representing the operating state of the loads in connection with one of the room controllers, and supplies these data to the image composition means: and the image composition means generates image data about a room status display which represents the operating state of the loads on a room controller basis by the composition of data, which includes at least the data fetched from the second memory, outputted from the control means.

9. A home bus system according to claim 8, wherein the control means reads from the second memory data representing background colors which differ for various operating states of a corresponding load, and outputs the fetched data to the image composition means.

10. A home bus system according to claim 8, wherein the control means, at least when a change in the operating state of the loads is indicated from the room controller, reads data from the second memory, and outputs the data to the image composition means; and the image composition means generates image data every time the image composition means receives data, which includes at least the data fetched from the second memory, outputted from the control means.

11. A home bus system according to claim 8, wherein the console has means for effecting paging: while a room status display appears on the screen, the control means, responsive to the paging instruction from the console, reads data comprising pictograph data depicting loads connected to the room controller on the room status display appearing on the screen but not contained in the same, and outputs the data to the image composition means; and the image composition means generates image data about a room status display screen on a page of the same room controller by the composition of data including at least the data fetched from the control means.

12. A home bus system according to claim 1, wherein the console has means for effecting the display of an appliance display: the control means has means responsive to the display instruction of the appliance display from the console for reading from the second memory data comprising character data representing load groups, pictograph data depicting the loads of the groups, and character data representing the names of the rooms where the loads are positioned, and outputting the data to the image composition means; and the image composition means generates image data about the appliance display screen which represents the loads and their locations on a group of loads basis.

13. A home bus system according to claim 1, wherein the console has means for instructing the control means to display the setting menu, and means for selecting one of the options from a setting menu appearing on the screen of the display means: the control means has means responsive to the display instruction of the setting menu display for reading from the second memory data comprising character data which represent a plurality of setting functions available in the visual controller, and outputting the data to the image composition means, and means for initiating the execution of routines which correspond to the setting menu selected from the control programs; and the image composition means generates image data about a function menu in which setting functions available in the visual controller are enumerated in characters by the composition of data, which includes at least the data fetched from the second memory, outputted from the control means.

14. A home bus system according to claim 13, further comprising a timer for controlling the operating time of loads whose operating time is set by the control means, and which are corresponded to the timer by the control means: the console has means for instructing the control means to display a room name setting display screen, means for effecting selective designation of a portion of a display appearing on the screen, means for incrementing or decrementing of the portional display selectively designated, means for effecting selective designation of pictographs appearing on the screen of the display means, means for instructing the timer setting screen to be displayed, and means for entering the operating conditions of the timer; the control means has means responsive to the display instruction of the room name setting screen from the console for fetching from the second memory data comprising character data representing the name of the room which corresponds to one of the room controllers and pictograph data depicting loads connected to the room controller, and outputting the data to the image composition means, means responsive to the display instruction of the timer setting display from the console for reading from the second memory data comprising pictograph data which depicts one of the loads, and outputting the data to the image composition means, means for replacing the portional display designated with a newly selected display which corresponds to the data incremented or decremented, and outputting the data to the image composition means in answer to the portional designation of the display, and means for setting the timer according to operating conditions inputted: and the image composition means has means for generating image data about the room name setting display of the room corresponding to the room controller by the composition of data, which includes at least the data fetched from the second memory, outputted from the control means, and means for generating image data about the timer setting display by the composition of data, which includes at least the data fetched from the second memory, outputted from the control means.

15. A home bus system according to claim 1, further comprising a timer whose operating time is set by the control means for controlling the operating time of loads corresponded to the timer by the control means; and wherein the console has means for instructing the control means to display a timer setting screen, means for effecting the selective designation of a pictograph appearing on the screen of the display means, and means for entering operating conditions of the timer: the control means has means responsive to the display of the timer setting display for reading from the second memory data representing a pictograph which depicts one of the loads, and outputting the data to the image composition means, and means for setting the timer according to the operating conditions entered: and the image composition means generates image data about the timer setting screen by the composition of data, which include at least the data fetched from the second memory, outputted from the control means.

16. A home bus system according to claim 15, wherein the console has means for implementing the display of a timer setting display, means for effecting the selective designation of a portion of a display appearing on the screen of the display means, and means for incrementing or decrementing the selectively designated portional display; the control means has means responsive to the display instruction of the timer setting display from the console for reading from the second memory data representing characters which denote the operating conditions of the timer, and means for entering new operating conditions of the timer in such a manner that a parameter of the operating conditions of the timer which corresponds to the portional image selectively designated by the console is replaced with a parameter of a portional image newly selected after having been incremented or decremented; and the image composition means generates image data about the timer setting display by the composition of data, which include at least the data fetched from the second memory, outputted from the control means.

17. A home bus system according to claim 15, wherein the console has means responsive to the hold instruction from the console for causing the operation of the timer to be held, and the control means temporarily holds the operation of the timer.

18. A home bus system according to claim 15, wherein the timer comprises a plurality of setting areas for storing the operating conditions of the plurality of loads.

19. A home bus system according to claim 18, wherein the console has means responsive to the hold instruction from the console for causing the operation of the timer to be held, and the control means temporarily holds the operation of the setting areas.

20. A home bus system according to claim 18, wherein the data fetched from the second memory and outputted to the image composition means by means of the control means comprises pictograph data depicting setting conditions of the timer, the pictographs being different in each case, namely, the first case where all of the setting areas are set in temporary hold, the second case where a portion of the setting areas are set in temporary hold, and the last case where none of the setting areas are set in temporary hold, and the image composition means generates image data about the room status display which includes the pictographs depicting the setting conditions of the timer by the composition of data, which includes at least the data fetched from the second memory, outputted from the control means.

21. A home bus system according to claim 20, wherein the control means reads data about background colors from the second memory so that the background color of the screen differs from the color of pictographs which depict the setting conditions of the timer, and outputs the data to the image composition means.

22. A home bus system according to claim 1, wherein the console has means for instructing the control means to display a room name setting screen, means for effecting the selective designation of a portion of the display appearing on the screen of the display means, and means for effecting increment or decrement of the selectively designated portional display: the control means has means responsive to an instruction from the console to display the room name setting display, which reads character data representing the name of a room corresponding to one of the room controllers and pictograph data which depict loads connected to the room controller from the second memory, and means responsive to the portional specification of the display and the increment or decrement instruction of the portional display for reading data from the second memory, and outputting the data to the image composition means: and the image composition means generates image data about the room name setting image of the room corresponding to the room controller by the composition of data, which include at least the data fetched from the second memory, outputted from the control means.

23. A home bus system according to claim further comprising a third memory for sequentially storing data fetched by the control means on a room name basis, and wherein the image composition means generates image data about the room status display representing the operating state of the loads connected to a plurality of room controllers grouped in one room name by the composition of data, which includes at least the data fetched from the second memory, outputted from the control means.

24. A home bus system according to claim 1, wherein if there is an output from a security sensor among the loads indicating the occurrence of an emergency, the control means reads from the second memory data comprising character data which represents the name of the room where the emergency arises, pictograph data which depicts the security sensor in operation, and character data which represents the name of the security sensor, and outputs the data to the image composition means; and the image composition means generates image data about the security display which represents an emergency output of the security sensor by the composition of data, which includes at least the data fetched from the second memory, outputted from the control means.

25. A home bus system according to claim 24, wherein the data about the display which depicts the emergency sensed by the security sensor represent characters.

26. A home bus system according to claim 24, wherein the data about the display which depicts the emergency sensed by the security sensor represent pictographs.

27. A home bus system according to claim 24, wherein the pictographs which depict the emergency sensed by the security sensor differ depending on the contents of the emergency.

28. A home bus system according to claim 24, wherein the control means causes the pictographs which represent the emergency sensed by the security sensor to blink by controlling the data to be outputted to the image composition means.

29. A home bus system according to claim 24, wherein in the case in which a plurality of sensors among the loads output the occurrence of an emergency at one time, the control means alternately performs the reading of data from the second memory and outputting of the data to the image composition means, and the image composition means alternately generates image data about the security display which represents the emergency output of the security sensor by the composition of data, which includes at least the data fetched from the second memory, outputted from the control means.

* * * * *